US008699448B2

(12) United States Patent
Lindqvist et al.

(10) Patent No.: US 8,699,448 B2
(45) Date of Patent: Apr. 15, 2014

(54) METHOD AND ARRANGEMENT FOR IMPROVED INTERFERENCE REJECTION COMBINING

(75) Inventors: Fredrik Lindqvist, Järfälla (SE); Fredrik Huss, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 35 days.

(21) Appl. No.: 13/513,575

(22) PCT Filed: Dec. 9, 2009

(86) PCT No.: PCT/SE2009/051395
§ 371 (c)(1),
(2), (4) Date: Jun. 2, 2012

(87) PCT Pub. No.: WO2011/071426
PCT Pub. Date: Jun. 16, 2011

(65) Prior Publication Data
US 2012/0243502 A1 Sep. 27, 2012

(51) Int. Cl.
*H04W 4/00* (2009.01)
(52) U.S. Cl.
USPC ............ 370/330; 370/341; 370/343; 370/345
(58) Field of Classification Search
USPC .......... 370/210, 329, 330, 341; 375/148, 227, 375/231, 346
See application file for complete search history.

(56) References Cited

U.S. PATENT DOCUMENTS

| | | | |
|---|---|---|---|
| 2006/0203894 A1* | 9/2006 | Ventola | 375/148 |
| 2008/0025200 A1* | 1/2008 | Tiirola et al. | 370/210 |
| 2008/0159451 A1* | 7/2008 | Majonen | 375/346 |
| 2008/0212666 A1* | 9/2008 | Kuchi et al. | 375/231 |
| 2008/0260012 A1* | 10/2008 | Majonen et al. | 375/227 |

OTHER PUBLICATIONS

Bartolome, D. et al. "MMSE Techniques for Space Diversity Receivers in OFDM-Based Wireless LANs." IEEE Journal on Selected Areas in Communications, vol. 21, No. 2, Feb. 2003.
Vook, F. W. et al. "Adaptive Antennas for OFDM." 48th IEEE Vehicular Technology Conference, May 18-21, 1998.

* cited by examiner

*Primary Examiner* — Brian D Nguyen
*Assistant Examiner* — Toan Nguyen
(74) *Attorney, Agent, or Firm* — Murphy, Bilak & Homiller, PLLC

(57) ABSTRACT

In a method of interference rejection combining (IRC) for mitigating interference in received signals in the frequency domain for a telecommunication system, selecting (S 10) a sub-group of frequencies of a received signal, determining (S20) a joint representation of a covariance matrix for the interference plus noise for at least one time slot of the received signal for the selected sub-group of frequencies, determining (S30) a channel estimate based on at least one pilot symbol of said at least one time slot. Finally, determining (S40) IRC coefficients in the frequency domain for each symbol of said at least one time slot based on said determined joint representation of the covariance matrix and said determined channel estimate.

10 Claims, 6 Drawing Sheets

METHOD AND ARRANGEMENT FOR IMPROVED INTERFERENCE REJECTION COMBINING

TECHNICAL FIELD

The present invention relates to telecommunication systems in general, and specifically to improved interference rejection combining (IRC) in multiple receiver antenna systems.

BACKGROUND

Interference rejection combining (IRC) [2-8] is a method to enhance the transmission capacity in a communication system by mitigating undesirable co-channel/adjacent interference. This is made possible by estimating and utilizing the spatial correlation of the interfering signals between multiple receiving antenna elements of the victim receiver. In doing so, the received interference is suppressed by spatial whitening. In the application of communication, the IRC is typically followed by receiver equalization and decoding. An alternative to IRC is maximum ratio combining (MRC) of the antenna signals. The MRC criterion serves to maximize the signal-to-noise ratio (SNR) rather than maximizing signal-to-interference-plus-noise-ratio (SINR).

A multi carrier system e.g. LTE (Long Term Evolution) employs reference symbols transmitted at known time/frequency resources, i.e., known pilot symbols, from which the SC-FDMA/OFDM (Single Carrier Frequency Division Multiple Access/Orthogonal Frequency Division Multiplexing) receiver can estimate the channel and the spatial covariance matrix of the interference plus noise.

For LTE UL (UpLink) user signals are allocated in the frequency domain by one or more groups of 12 contiguous sub carriers, i.e. one or more resource blocks (RB:s). For LTE DL (DownLink) the RB:s are also allocated in the frequency domain but not necessarily contiguously. Hence, for both UL and DL the LTE cell-interference tends to be frequency-dependent. Moreover, adjacent interference due to e.g. leakage from neighboring systems typically interfere more at the frequency band edges. Thus, also the adjacent interference tends to be frequency-dependent.

IRC can typically be viewed as spatially whitening the received signal before further processing and combining the antenna signals according to e.g. the MRC algorithm. The coefficients of the whitening filter are typically calculated from the estimated wideband residual noise, e.g. the spatial covariance matrix of the interference plus noise. Different criterions such as the minimum means-square error (MMSE) and the optimum combining (OC) have been proposed to compute the IRC coefficients [1].

A frequency-domain based IRC approach, described in e.g. [1] (referred to as "digital beam forming in the frequency domain"), transforms the broadband received signal into the frequency domain with a Fast Fourier Transform (FFT) and performs IRC (or beam forming) per frequency bin, followed by inverse Fast Fourier Transform of the combined signal. The IRC coefficients are in this case selected by independently minimizing the mean output power at each frequency bin.

The major drawback with previously described IRC methods [2-8] for multi-carrier based systems, as e.g. LTE, are the high computational complexity associated with calculating the IRC coefficients, and the reduced performance in case of wideband IRC with frequency-dependent interference.

More specifically, the disadvantages with employing wideband IRC for LTE are the following:

With strong frequency-dependent interference, e.g. cell-interference/co-channel interference, the optimal whitening filter is a function of frequency, and hence, the receiver performance with wideband IRC is typically reduced compared to frequency-dependent IRC.

The disadvantages with employing frequency-bin based IRC are the following:

The computational complexity associated with estimating the frequency-dependent whitening filter and the frequency-dependent spatial noise covariance matrix are significant and grows strongly with the number of sub carriers and antennas.

There is therefore a need for a solution to the above mentioned disadvantages.

SUMMARY

The present invention relates to improved interference rejection combining in a telecommunication system.

Specifically, the present invention relates to a method of interference rejection combining which is less computational complex compared to prior art.

Basically, a method of interference rejection combining (IRC) for mitigating interference in the frequency domain for received signals in a telecommunication system, comprises the steps of selecting (S10) a sub-group of frequencies, determining (S20) a joint representation of a covariance matrix for the interference plus noise in the frequency domain for at least one time slot of the received signal for the selected sub-group of frequencies. Subsequently, determining (S30) a channel estimate for the pilot symbol of said at least one time slot. Finally, determining (S40) IRC coefficients in the frequency domain for each symbol of said time slot based on said determined joint representation of the covariance matrix and said determined channel estimates.

Advantages of the present invention enable reduction of computational complexity in estimation of IRC coefficients. This is further advantageous for a case where IRC is followed by MMSE equalization.

BRIEF DESCRIPTION OF THE DRAWINGS

The invention, together with further objects and advantages thereof, may best be understood by referring to the following description taken together with the accompanying drawings, in which.

ABBREVIATIONS

Figure 1:
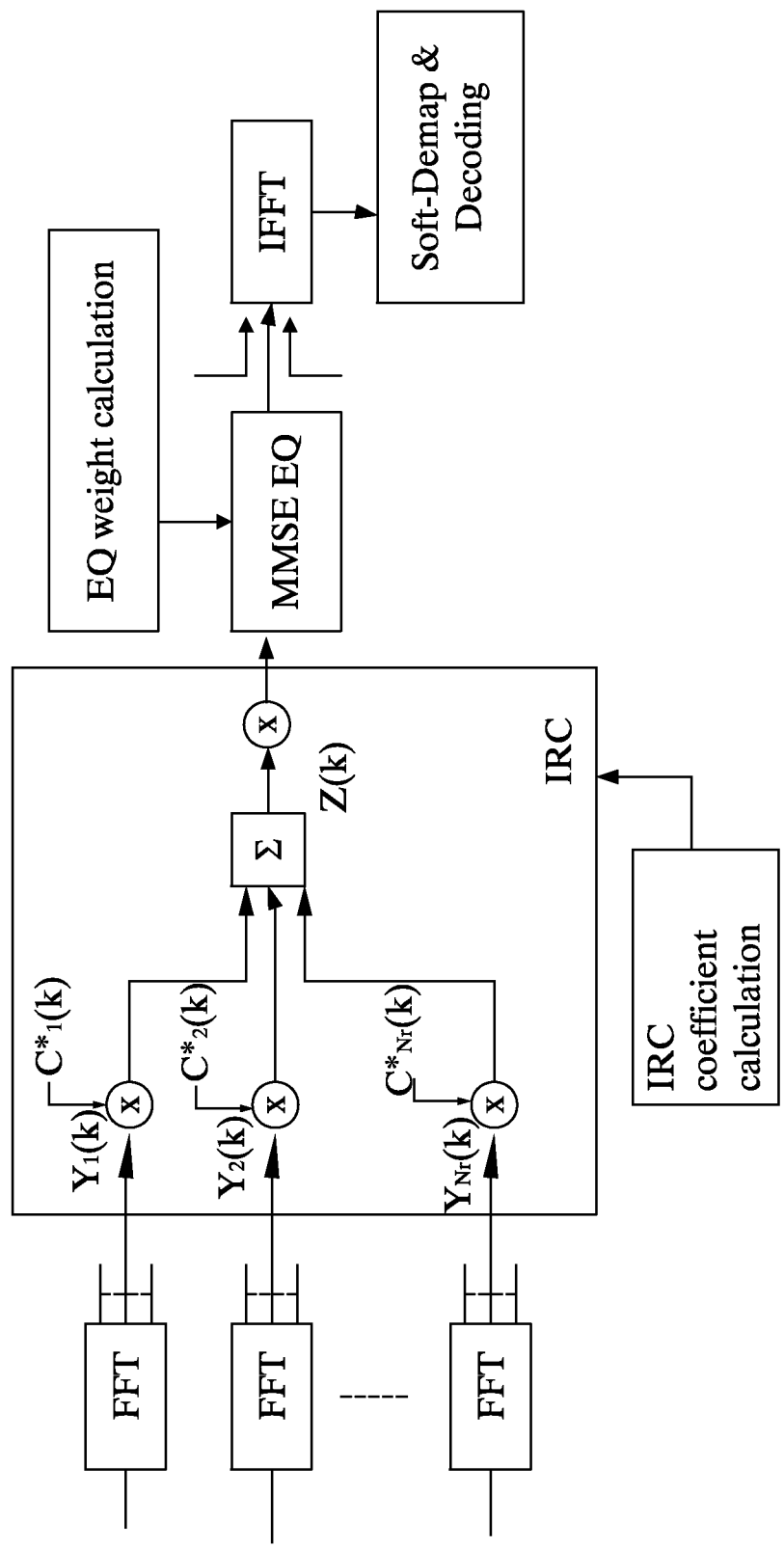
FIG. 1 is an illustration of a system in which the present invention can be utilized.

DL  Downlink
IRC  Interference Rejection Combining

-continued

ABBREVIATIONS

| | |
|---|---|
| LTE | Long Term Evolution |
| MMSE | Minimum Mean Square Error |
| MRC | Maximum Ratio Combining |
| OC | Optimum Combining |
| OFDM | Orthogonal Frequency Division Multiplexing |
| PUSCH | Physical Uplink Shared Channel |
| RB | Resource Block |
| RS | Reference Symbol (pilot symbol) |
| SC-FDMA | Single Carrier Frequency Division Multiple Access |
| SINR | Signal to Interference plus Noise Ratio |
| SNR | Signal to Noise Ratio |
| UL | Uplink |

DETAILED DESCRIPTION

In the following disclosure, the present invention will be described in the context of a LTE UL with IRC, more specifically for LTE PUSCH. However, it is equally possible to apply the present invention in relation to e.g. LTE DL with OFDM or other similar multi-carrier systems.

An equalizer is normally required to improve the system performance, and more specifically, to combat the undesirable inter-symbol-interference and/or simplifying the decoding process. For LTE, a so-called minimum mean-square error (MMSE) equalizer is typically used.

The present disclosure addresses the computational-complexity problem with known IRC methods for multi carrier systems e.g. LTE by providing a low-complexity method of calculating the IRC coefficients with additional complexity savings when used in combination with a MMSE equalizer.

In most prior art systems, IRC coefficients are typically calculated based on an estimate of the covariance matrix of the received signal interference plus noise. The latter can be obtained by means of e.g. subtracting the known transmitted pilot symbols from the total received signal consisting of target signal, interference, and noise. This subtraction is advantageously performed in the frequency domain as it provides a frequency-dependent estimate of the interference plus noise.

It can be observed that the covariance matrix of the interference plus noise can be estimated, according to the present invention, on groups of frequencies (i.e. sub carriers in OFDM/SC-FDMA) rather than having one wideband estimate. In many applications the spectrum of the interference plus noise can be assumed approximately flat over a group of frequencies whereupon the accuracy of the covariance matrix estimate can be improved substantially by utilizing all frequencies within the group. Moreover, calculating the covariance estimates on groups of frequencies also reduce the computational complexity, compared to having one estimate per frequency, as the IRC coefficients are typically calculated from the inverted covariance matrix. That is, for each group of frequencies only one computational-costly matrix inversion has to be performed according to the present invention. Thus, for a wireless system with frequency-dependent co-channel/adjacent channel interference, the present disclosure provides means to control the trade-off between the IRC computational complexity and the performance (e.g. the system throughput or block error rate), by adjusting the number of frequencies per group.

More specifically, the basic concept of the invention comprises an estimation of IRC coefficients in the frequency domain on groups of sub carriers in order to reduce the computational complexity compared to frequency-bin based IRC [1] while at the same time achieving frequency-dependent mitigation of co-channel/adjacent interference. The basic concept employs coefficient calculation with interpolation/extrapolation between successive reference symbols (pilot symbols) in order to further reduce the computational complexity.

Due to the nature of the SC-FDMA, standardized for e.g. LTE UL, the proposed algorithm can be advantageously combined with conventional MMSE equalization in order to further reduce the overall complexity compared to performing IRC and MMSE-equalization as separate functions. (as illustrated in FIG. 1).

Figure 2:
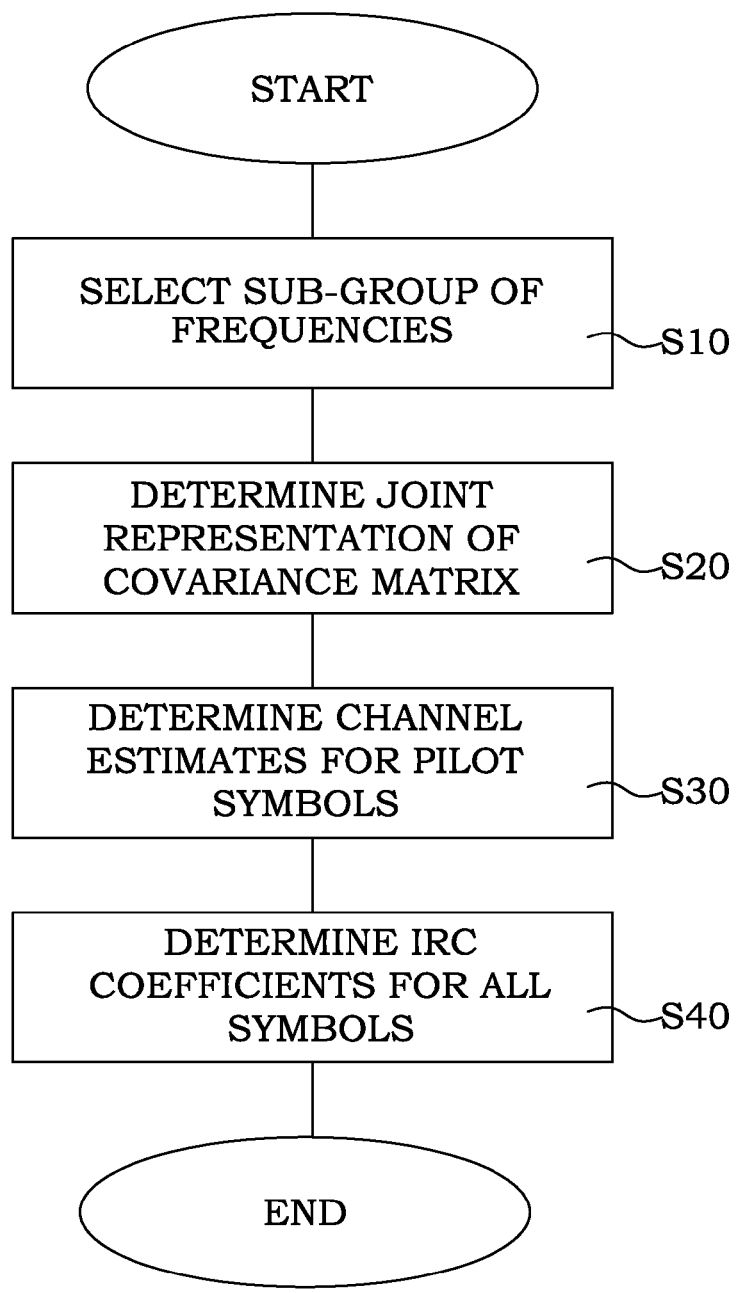
FIG. 2 is a schematic flowchart of an embodiment of a method according to the present invention.

Basically, according to a general embodiment of the invention and with reference to FIG. 2, a method of interference cancellation of a received signal in the frequency domain comprises selecting S10 a sub-group of frequencies or resource block (RB) of the bandwidth of a received signal. Subsequently, a joint representation of the covariance matrix for the interference plus noise over at least one slot of the received signal is determined S20 for the selected sub-group of frequencies. Then, a respective channel estimate is determined S30 for each of at least one pilot symbol in said slot. Finally, IRC coefficients in the frequency domain are determined S40 for each symbol in the slot based on the determined joint estimate of the covariance matrix and the determined channel estimate. The representation of the covariance matrix can comprise the actual covariance matrix, the inverse of the covariance matrix, or some other function thereof.

According to a specific embodiment, the method comprises selecting S10 a sub group of frequencies or resource block (RB) of the signal. Subsequently, a joint representation of the covariance matrix for the interference over a plurality of time slots comprising an entire sub frame of the received signal is determined S20 for the selected sub-group of frequencies. This can typically be achieved, according to a special case of the previous embodiment, by estimating the covariance matrix for two successive time slots or pilot symbols and setting the average of the two estimates to be the aforementioned joint representation. Subsequently, a respective channel estimate is determined S30 for at least two successive pilot symbols of the sub-frame. Finally, the IRC coefficients for each symbol of the sub-frame are determined S40 based on the determined joint representation of the covariance matrix and the determined channel estimates.

Figure 3:
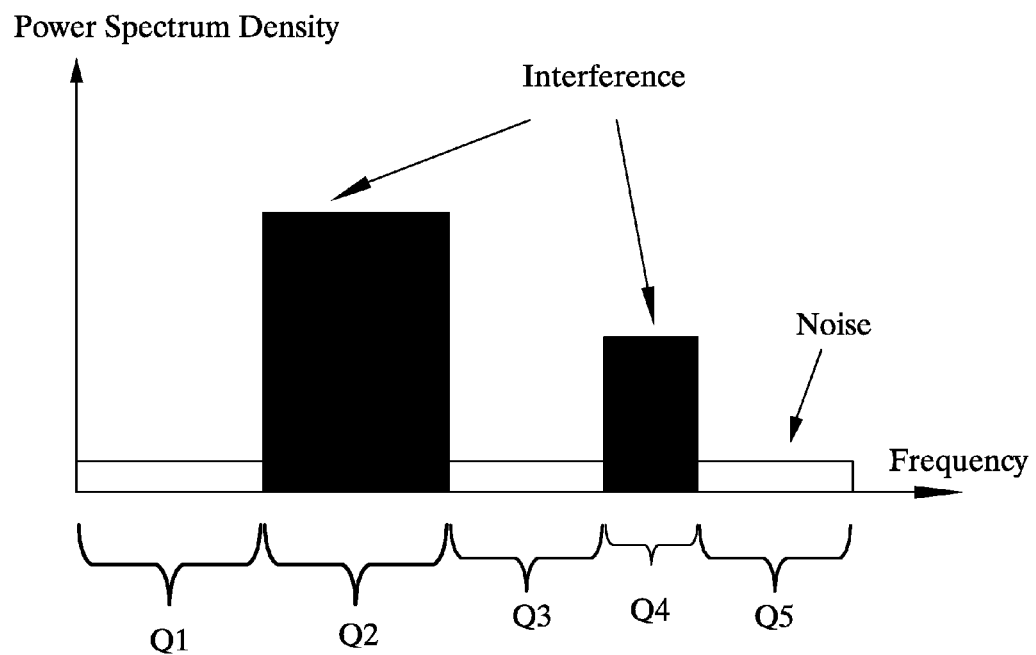
FIG. 3 is a schematic illustration of an embodiment of the present invention.

In certain scenarios, the bandwidth of the main interference is known a priori, with reference to FIG. 3, whereupon the group of frequencies per covariance estimate can be pre-set in order to achieve high IRC performance while at the same time keeping the IRC computational complexity low. Alternatively, the bandwidth of the interference is first estimated whereas the number of frequencies per group is adaptively adjusted to follow the time-varying conditions.

Figure 4:
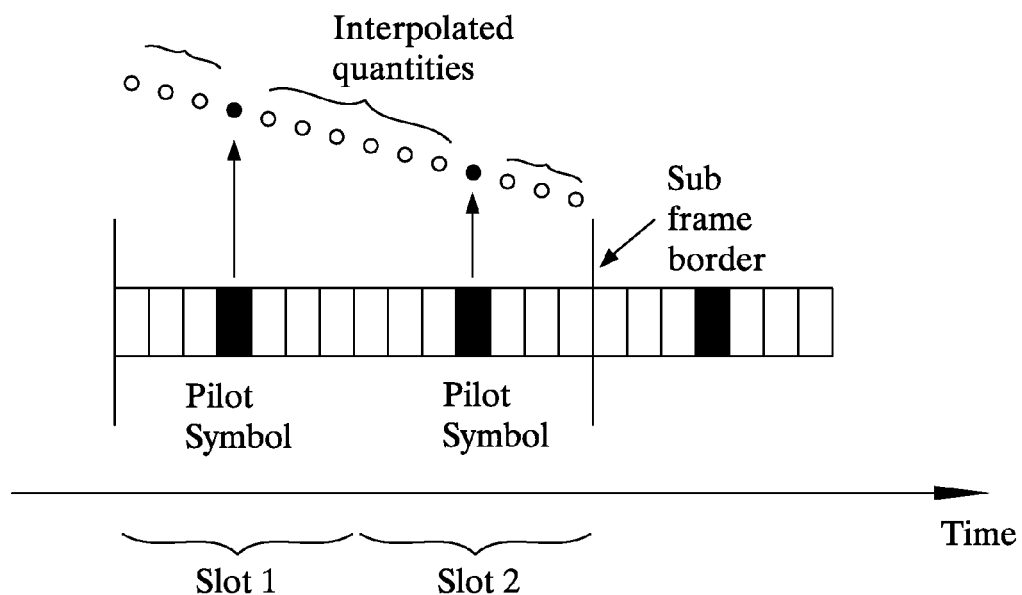
FIG. 4 is a schematic illustration of an embodiment of the present invention.

In a typical communication system, known pilot symbols are transmitted at regular intervals by the transmitter to allow efficient demodulation and decoding at the intended receiver. In some scenarios, improved system performance can be obtained if the estimated quantities, such as channel estimate, are interpolated over time i.e. averaged/interpolated based on the pilot symbols. This is illustrated in FIG. 4 which for the purpose of illustration assumes the LTE UL frame structure with two slots per sub frame (1 ms) with one pilot or reference symbol per slot (0.5 ms).

Figure 5:
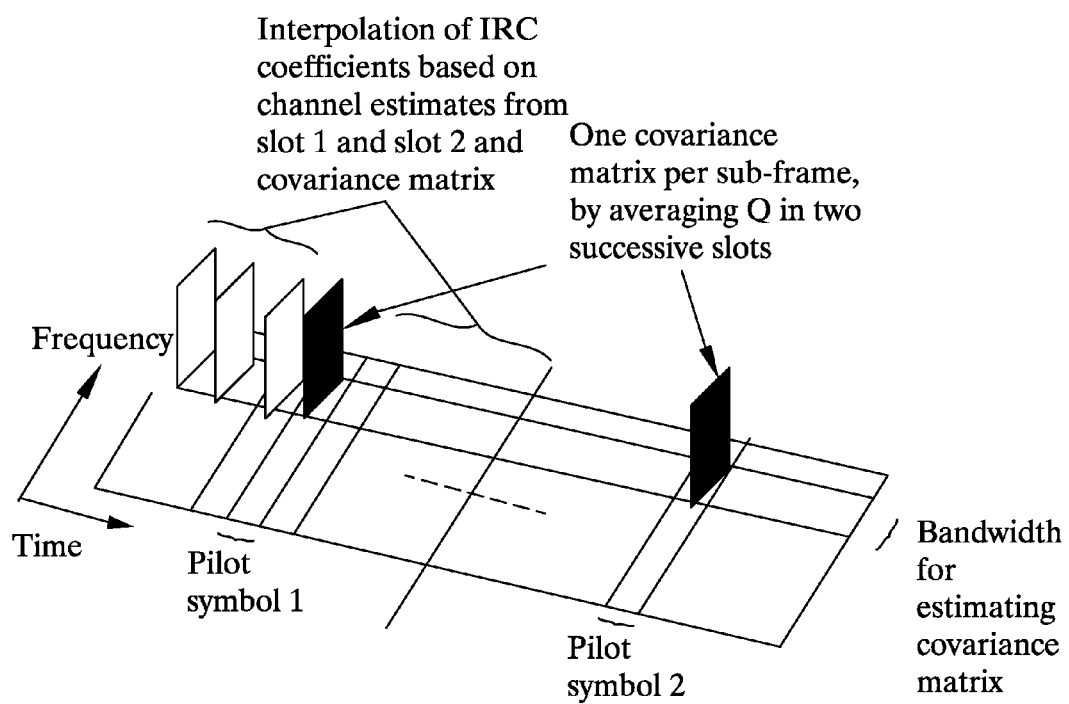
FIG. 5 is a schematic illustration of an embodiment of the present invention.

According to a specific embodiment of the present invention a straightforward IRC implementation with interpolation would first interpolate the pilot channel estimates (e.g. from two successive slots) and thereafter calculate the IRC coefficients by multiplying the interpolated channel estimates with the estimated (inverted) covariance matrix (valid for both slots). However, according to another specific embodiment, the computational complexity can be reduced even further by re-formulating the interpolation equations in such a way that the IRC coefficients are directly linearly combined. In essence, the interpolation reduces the complexity to two multiplications (scaling with interpolation coefficients) and one addition, for each IRC coefficient. This is further illustrated in FIG. 5.

To further explain the concept, specific mathematics and benefits of the present invention in comparison to prior art, a detailed description about the system and system model will be described below.

System Model

Firstly, the received frequency domain spatial vector of size $N_r \times 1$ for a considered user at sub carrier k is defined by $\overline{Y}(k)=[Y_1(k)Y_2(k)\ldots Y_{N_r}(k)]^T$, where $N_r$ denotes the number of receiver antenna elements for the user receiver. Furthermore, the corresponding spatial channel vector is defined by $\overline{H}(k)=[H_1(k)H_2(k)\ldots H_{N_r}(k)]^T$. With this notation, the received frequency domain spatial vector can be rewritten according to Equation (1) below $$\overline{Y}(k)=X(k)\overline{H}(k)+\overline{D}(k), \tag{1}$$

where $X(k)$ denotes the transmitted signal component (scalar value) for sub carrier k and $\overline{D}(k)=[D_1(k)D_2(k)\ldots D_{N_r}(k)]^T$ is the spatial disturbance vector containing the interference plus AWGN (Additive White Gaussian Noise) at all $N_r$ receiver antennas.

IRC with Optimum Combining

As already mentioned, FIG. 1 shows a typical LTE PUSCH receiver where the proposed IRC processing in the frequency domain, highlighted by the IRC box, can be implemented. Here the IRC coefficient-vector for sub carrier k is denoted by $\overline{C}(k)=[C_1(k)C_2(k)\ldots C_{N_r}(k)]^T$, which is assumed to be calculated according to the optimum combining (OC) algorithm.

The output from the IRC algorithm is denoted by $Z(k)$, for sub carrier k, and can be expressed by the following inner-product in Equation (2):

$$Z(k) = \overline{C}^H(k)\overline{Y}(k) = \sum_{j=1}^{N_r} C_j^*(k)Y_j(k) \tag{2}$$

where $^H$ denotes the Hermitian transpose operation and * is the complex conjugate.

Thus, the total received signal after IRC processing can be written by Equation (3):

$$Z(k)=\overline{C}^H(k)\overline{Y}(k)=\overline{C}^H(k)\overline{H}(k)X(k)+\overline{C}^H(k)\overline{D}(k) \tag{3}$$

Now assume that the spatial disturbance vector can be approximated by the complex Normal distribution with zero mean vector and covariance matrix $Q(k)=E\{\overline{D}(k)\overline{D}^H(k)\}$ of size $N_r \times N_r$, i.e. assume $\overline{D}(k) \sim CN(\overline{0}, Q(k))$. With this notation, the ideal OC coefficient vector of size $N_r \times 1$ is given by Equation (4)

$$\overline{C}(k)=Q^{-1}(k)\overline{H}(k) \tag{4}$$

which provides the IRC output $Z(k)$ according to Equation (5) below $$Z(k) = \overline{H}^H(k)Q^{-1}(k)\overline{H}(k)X(k) + \overline{H}^H(k)Q^{-1}(k)\overline{D}(k) \tag{5}$$

$$= g_{irc}(k)X(k) + \tilde{D}(k)$$

In the last steps the fact that $Q(k)$ is Hermitian symmetric has been used, i.e. Equation (6), $$Q(k)=Q^H(k) \tag{6}$$

Thus, the IRC output can be represented by the linear signal model $Z(k)$ in Equation (7)

$$Z(k)=g_{irc}(k)X(k)+\tilde{D}(k), \tag{7}$$

where the following quantities have been introduced, for notational simplicity; the real-valued gain factor $g_{irc}(k)$ is introduced according to Equation (8)

$$g_{irc}(k)=\overline{C}^H(k)\overline{H}(k)=\overline{H}^H(k)Q^{-1}(k)\overline{H}(k) \tag{8}$$

and the output disturbance component $\tilde{D}(k)$ is expressed according to Equation (9)

$$\tilde{D}(k)=\overline{C}^H(k)\overline{D}(k)=\overline{H}^H(k)Q^{-1}(k)\overline{D}(k) \tag{9}$$

The variance of $\tilde{D}(k)$ is easily found to be $\sigma_{\tilde{D}(k)}^2$ according to Equation (10)

$$\sigma_{\tilde{D}(k)}^2=E\{\overline{C}^H(k)\overline{D}(k)(\overline{C}^H(k)\overline{D}(k))^H\}=\overline{C}^H(k)Q(k)\overline{C}(k)=\overline{H}^H(k)Q^{-1}(k)\overline{H}(k) \tag{10}$$

MMSE Equalization

The weights of the MMSE equalizer minimize the mean-square error (MSE) between the known RS symbols (i.e. pilots) and the output of the equalizer. This minimization problem can be formulated as follows, see Equation (11), by using the notation in previous subsection:

$$\min_{W(k)} \|X(k) - Z(k)W(k)\|^2, \tag{11}$$

where $X(k)$ denotes the kth sub carrier of the RS symbol and $W(k)$ is the equalizer weight for sub carrier k.

It is well known from the comprehensive theory on the subject of MSE minimization, and easy to show, that the minimum MSE (MMSE) to this problem is obtained by selecting the kth weight as $W_{MMSE}(k)$ according to Equation (12)

$$W_{MMSE}(k)=E\{X(k)Z^*(k)\} \cdot E\{Z(k)Z^*(k)\}^{-1} \tag{12}$$

With the linear signal model defined in previous sub-section, we find straightforwardly that the MMSE equalizer weights $W_{MMSE}(k)$ can be express as Equation (13)

$$W_{MMSE}(k) = \frac{g_{irc}^*(k)}{|g_{irc}(k)|^2 + \sigma_{\tilde{D}(k)}^2}, \tag{13}$$

Exploiting the expressions for $g_{irc}(k)$ and $\sigma_{\tilde{D}(k)}^2$ in [Eq. 8-Eq. 9], the MMSE weights $W_{MMSE}(k)$ yield according to Equation (14)

$$W_{MMSE}(k) = \frac{1}{g_{irc}(k)+1}. \tag{14}$$

IRC with MMSE Equalization

By using the results above, it is possible to express the overall processing for OC IRC with the MMSE-equalization as Equation (15)

$$\hat{X}(k) = W_{MMSE}(k)Z(k) = \frac{\bar{C}^H(k)\bar{Y}(k)}{g_{irc}(k)+1} = \frac{\hat{\bar{H}}^H(k)\hat{Q}^{-1}(k)\bar{Y}(k)}{\hat{\bar{H}}^H(k)\hat{Q}^{-1}(k)\hat{\bar{H}}(k)+1} \quad (15)$$

where $\bar{Y}(k)$ is the received spatial vector for sub carrier k, and where $\bar{\bar{H}}(k)$ and $\hat{Q}(k)$ are the corresponding channel and covariance matrix estimate, respectively.

Specifically, for the present invention, first consider IRC coefficient computation on slot basis. Later on, reducing the computational complexity by instead utilizing interpolation/extrapolation between successive slots will be described.

Slot-Based Estimation

Each received time slot contains one known reference symbol (RS) or pilot symbol from which the IRC coefficients can be calculated. The so obtained slot-based processing is described in the following.

The $N_r \times 1$ IRC coefficient vector is typically computed according to Equation (16) as $$\bar{C}(k) = \hat{Q}^{-1}(k)\bar{\bar{H}}(k), \quad (16)$$

which consist of a $N_r \times N_r$ estimated complex matrix $\hat{Q}^{-1}$ multiplied with a $N_r \times 1$ complex vector. However, in order to reduce the complexity according to the present invention the covariance matrix $\hat{Q}$, and its inversion $\hat{Q}^{-1}$, should only be computed on groups of sub carriers, e.g. per RB or groups of RB:s, and not for each sub carrier. In order to explicitly stress this, the notation $\hat{Q}(k_{RB})$ is employed, where $k_{RB}=1, 2, \ldots, N_{RB}$ is the index for the considered RB or sub-group of frequencies. The corresponding $N_r \times N_r$ covariance matrix $\hat{Q}(k_{RB})$ can be expressed as Equation (17)

$$\hat{Q}(k_{RB}) = E(k_{RB})E^H(k_{RB}) \cdot \frac{1}{N_{SC}^{RB}}, \quad (17)$$

where the $N_r \times N_{SC}^{RB}$ matrix $E(k_{RB})=[\bar{E}_1(k_{RB})\bar{E}_2(k_{RB}) \ldots \bar{E}_{N_r}(k_{RB})]^T$ contains the noise plus interference vectors for the considered RB at each antenna element, where the latter are defined by Equation (18)

$$\bar{E}_i(k_{RB})=[E_i(1)E_i(2) \ldots E_i(N_{SC}^{RB})]^T, \text{ for } i=1,2,\ldots,N_r. \quad (18)$$

Here the estimated noise plus interference component for antenna i and sub carrier k yields Equation (19)

$$E_i(k)=Y_i(k)-\hat{H}_i(k)X(k), \text{ for } k=1,2,\ldots,N_{SC}^{RB}, \quad (19)$$

which is based on the corresponding channel estimate $\hat{H}_i(k)$ and RS $X(k)$. In case $N_r=2$, the inversion of $$\hat{Q}(k_{RB}) = \begin{bmatrix} q_{11} & q_{12} \\ q_{12}^* & q_{22} \end{bmatrix}$$

is easily computed as Equation (20)

$$\hat{Q}^{-1}(k_{RB}) = \frac{1}{q_{11}q_{22}-|q_{12}|^2}\begin{bmatrix} q_{22} & -q_{12} \\ -q_{12}^* & q_{11} \end{bmatrix}, \quad (20)$$

which is then used for multiplication with $\bar{\bar{H}}(k)$ in order to calculate $\bar{C}(k)$. However, in case $N_r>2$ it is not efficient to use a direct formula for calculating the inverse. According to the present invention it is therefore proposed to solve this for each group of sub carriers (e.g. per RB) by means of the Cholesky decomposition of $\hat{Q}(k_{RB})$ followed by forward and backward substitution.

That is, see Equation (21) below, $$\hat{Q}(k_{RB})=L(k_{RB})L(k_{RB})^H, \quad (21)$$

where $L(k_{RB})$ is the lower-diagonal matrix obtained from the Cholesky decomposition of $\hat{Q}(k_{RB})$. Secondly, solve $\bar{C}(k)$ in system Equation (22)

$$L(k_{RB})L(k_{RB})^H\bar{C}(k)=\bar{\bar{H}}(k), \text{ for } k=1,2,\ldots,N_{SC}^{RB}, \quad (22)$$

which is equivalent to solving $\bar{C}(k)$ in the two following linear systems in Equation (23)

$$\begin{cases} L(k_{RB})\bar{v} = \hat{\bar{H}}(k) \\ L(k_{RB})^H\bar{C}(k) = \bar{v} \end{cases}, \text{ for } k=1,2,\ldots,N_{SC}^{RB}, \quad (23)$$

where the first system can be solved by forward substitution and the second system with backward substitution. An alternative here is to calculate the inverse $\hat{Q}(k_{RB})$ explicitly followed by matrix multiplication to get $\bar{C}(k)$. It is also possible to use LDL decomposition instead of Cholesky decomposition, which will avoid taking square roots. In case the performance loss due to numerical round-off errors in the Cholesky or LDL decomposition is unacceptable, e.g. QR or SVD decomposition could be used instead but at the cost of added complexity.

Interpolation and Extrapolation Between Slots

A slot-based implementation according to the invention implies that $\hat{Q}(k_{RB})$ is estimated per slot for each group of sub carriers (e.g. per slot and RB), followed by the calculation of the IRC coefficients $\bar{C}(k)$ per SC-FDMA symbol for each sub carrier $k=1, 2, \ldots, N_{SC}^{RB}$ within the considered group (e.g. within the considered RB). As described above these two quantities are obtained based on the channel estimate $\bar{\bar{H}}(k)$. To improve the system performance, the channel estimate $\bar{\bar{H}}(k)$ is preferably interpolated and extrapolated between two consecutive slots within the same sub frame. This can be expressed as Equation (24)

$$\bar{\bar{H}}_n(k)=\alpha_n(k)\bar{\bar{H}}_{rs_1}(k)+\beta_n(k)\bar{\bar{H}}_{rs_2}(k), \text{ for } n=1,2,\ldots,N_{symb}, \quad (24)$$

where $\bar{\bar{H}}_{rs_1}(k)$ and $\bar{\bar{H}}_{rs_2}(k)$ denote the first and the second channel estimate obtained for the first and second RS symbol, respectively, for the considered sub frame. Note that it is here assumed that each sub frame consists of $N_{symb}$ number of SC-FDMA symbols, excluding the two RS symbols, divided between the two slots. Moreover, $\alpha_n, \beta_n$ are the interpolation coefficients that can be calculated by ordinary means, e.g. with linear interpolation.

Hence, an ordinary implementation would compute $\bar{\bar{H}}_n(k)$ for $n=1, 2, \ldots, N_{symb}$, and use these together with $\hat{Q}^{-1}(k_{RB})$ to compute the IRC coefficient vector $\bar{C}_n(k)$, for $n=1, 2, \ldots, N_{symb}$.

However, the computational complexity can be reduced, according to the present invention, significantly by assuming that $\hat{Q}(k_{RB})$ is constant over a plurality of time slots comprising one sub frame, which corresponds to 1 ms for LTE, and instead interpolate/extrapolate the IRC coefficient vector $\hat{Q}^{-1}(k_{RB})\bar{\bar{H}}(k)$. Thus, it is proposed to interpolate/extrapolate according to Equation (25)

$$\begin{cases} \overline{C}_n(k) = \alpha_n(k)\overline{C}_{rs_1}(k) + \beta_n(k)\overline{C}_{rs_2}(k) \\ \overline{C}_{rs_1}(k) = \hat{Q}^{-1}(k_{RB})\hat{\overline{H}}_{rs_1}(k) \\ \overline{C}_{rs_2}(k) = \hat{Q}^{-1}(k_{RB})\hat{\overline{H}}_{rs_2}(k), \end{cases} \quad (25)$$

for n=1, 2, . . . , $N_{symb}$, which avoids several computational steps necessary with the described ordinary implementation. In practice, $\hat{Q}(k_{RB})$ is typically estimated by averaging over the slots. In addition, the interpolated/extrapolated results can be re-used when combining MMSE equalization with IRC in order to lower the overall IRC and equalization complexity via (Eq 8).

In summary, the proposed IRC coefficient computation with interpolation/extrapolation requires only one (inverted) covariance estimate per sub frame and per group of sub carriers. The channel estimates are assumed to be available as they are required by ordinary demodulation and decoding. The remaining processing involves the computation of the interpolation/extrapolation coefficients $\alpha_n$, $\beta_n$, which is of significantly less complexity compared to a slot-based processing.

As described above, the selection of the sub-group of frequencies can be performed in a plurality of different ways. If there is available knowledge about the frequency distribution of interfering signals, it is advantageous to select the size of the sub-group to correspond to the frequency distribution of the interference. This could for instance result in a scenario where the size of every sub-group is selected according to the determined frequency distribution, or the size of each selected sub group is selected dynamically. Consequently, for the entire bandwidth the sub-groups of frequencies can have a same size or a different size. It can be observed, that the size of the sub-groups is further determined based on the number of receiver antennae in the system.

According to one advantageous embodiment, the size of the sub-groups is chosen as multiples of 12 frequencies. The reason for this is that the interfering signals are typically allocated in multiple of 12 frequencies. The smallest possible allocation for an interferer is thus 12 frequencies. For a case of two receiver antennas, the size of the subgroup would then be determined as 12 frequencies. If there are more receiver antennas available, the number of parameters to estimate for the covariance matrix $\hat{Q}(k_{RB})$ becomes larger. It is then advantageous to increase the size of the sub-groups in order to obtain more accurate estimates. For the case of four receiver antennae, 24 frequencies would be selected.

Figure 6:
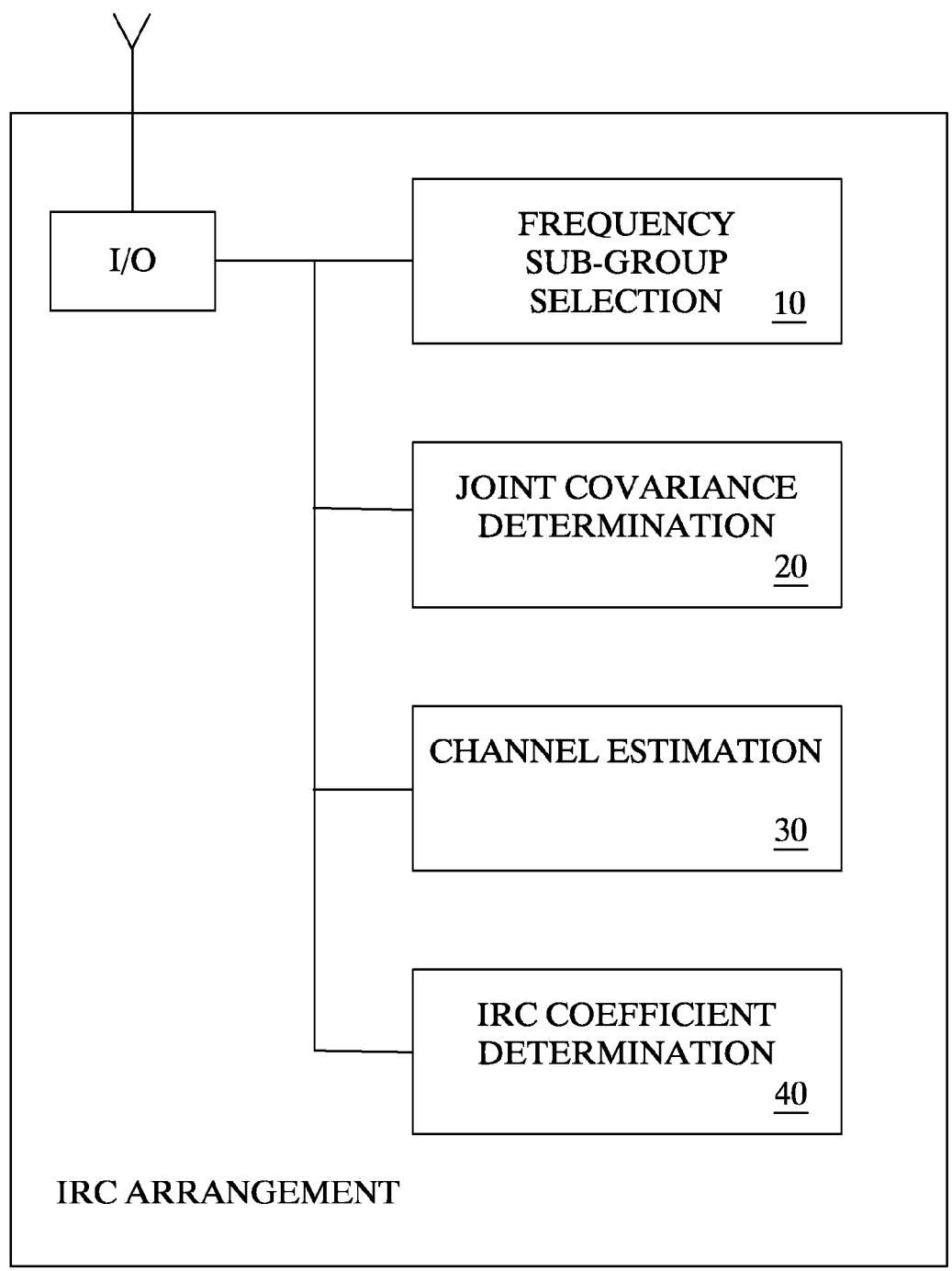
FIG. 6 is a schematic block diagram of an embodiment of an arrangement according to the present invention.

With reference to FIG. 6, an arrangement for enabling the method of the present invention will be described. The arrangement is typically located in a receiver in the telecommunication system, thus comprising any known necessary functionality for receiving and decoding. According to the basic embodiment, the arrangement comprises a generic I/O unit for receiving and handling received signals from a plurality of receiver antennas. Further, the arrangement includes a frequency selector unit 10 adapted to select a sub-group of the frequencies, a covariance determining unit 20 for determining a joint representation of a covariance matrix for the interference plus noise for at least one time slot of the received signal based on the selected sub-group of frequencies. In addition, the arrangement includes a channel estimator unit 30 for determining a respective channel estimate for at least one pilot symbols of the at least one time slot. Finally, the arrangement includes an IRC unit 40 for determining the IRC coefficients in the frequency domain for each symbol of the sub-frame based on the determined joint representation of the covariance matrix and the determined channel estimates.

The arrangement is further adapted to enable the embodiments of the method according to the present invention.

Advantages of the present invention comprise overall improved system with reduced computational complexity.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] L. C. Godara, "Application of Antenna Arrays to Mobile Communications, Part II: Beam-Forming and Directional-of-Arrival Considerations", Proc. Of IEEE, vol 85, No. 8, August 1997.
[2] Patent Application WO 01/13463 A1, PCT/SE00/01523, Pub. Date 22 Feb. 2001, L M Ericsson.
[3] Patent Application WO 02/075950 A1, PCT/IB02/00814, Pub. Date 26 Sep. 2002, Nokia Corporation.
[4] Patent Application, US 2007/0161361 A1, Pub. Date Jul. 12, 2007, Nokia Corporation.
[5] Patent Application, WO 2007/080226 A1, Pub. Date 19 Jul. 2007, Nokia Corporation.
[6] Patent Application, WO 2007/147943 A1, Pub. Date 27 Dec. 2007, Nokia Corporation.
[7] Patent Application, WO 2008/056224 A2, Pub. Date 15 May 2008, Nokia Corporation.
[8] Patent Application US 2009/0116568 A1, Pub. Date May 7, 2009, L M Ericsson.

The invention claimed is:

1. A method of interference rejection combining (IRC) for mitigating interference in received signals in the frequency domain for a telecommunication system, the method comprising:
    selecting a sub-group of frequencies of a received signal;
    determining a joint representation of a covariance matrix for the interference plus noise for a plurality of time slots of the received signal for the selected sub-group of frequencies, the plurality of time slots comprising an entire sub-frame of the received signal for the selected sub-group of frequencies;
    determining a channel estimate based on two successive pilot symbols of said sub-frame;
    determining IRC coefficients in the frequency domain for each symbol of said sub-frame based on said determined joint representation of the covariance matrix and said determined channel estimate.

2. The method of claim 1, wherein said representation of a joint representation of a covariance matrix comprises the inverse of said covariance matrix.

3. The method of claim 2, wherein said determining of IRC coefficients comprises calculating the IRC coefficients for said pilot symbols based on said inverted covariance matrix and said pilot channel estimates and subsequently interpolating said calculated pilot IRC coefficients.

4. The method of claim 1, wherein said selecting the sub-group of frequencies comprises estimating a bandwidth for a main interference, and selecting a size of said sub-group to correspond to said estimated bandwidth.

5. The method of claim 1, further comprising repeating said selecting of a sub-group of frequencies until all frequencies of the bandwidth of the received signal have been taken into account.

6. The method of claim 5, further comprising dynamically varying the size for each said selected sub-group.

7. The method of claim 5, further comprising selecting said sub-groups based on a predetermined size.

8. The method of claim 1, wherein said determining IRC coefficients comprises determining IRC coefficients of:

$$\begin{cases} \overline{C}_n(k) = \alpha_n(k)\overline{C}_{rs_1}(k) + \beta_n(k)\overline{C}_{rs_2}(k) \\ \overline{C}_{rs_1}(k) = \hat{Q}^{-1}(k_{RB})\hat{\overline{H}}_{rs_1}(k) \\ \overline{C}_{rs_2}(k) = \hat{Q}^{-1}(k_{RB})\hat{\overline{H}}_{rs_2}(k) \end{cases}$$

where $\overline{C}_n(k)$ is the IRC coefficient for symbol n and sub carrier k, $\alpha_n(k)$, $\beta_n(k)$ are the interpolation coefficients for symbol n and sub carrier k, $\overline{C}_{rs_1}(k)$, $\overline{C}_{rs_2}(k)$ are the IRC coefficients for the two pilot symbols for sub carrier k, $\hat{Q}^{-1}(k_{RB})$ is the inverted covariance matrix for frequency subgroup $k_{RB}$, $\overline{H}_{rs_1}(k), \overline{H}_{rs_2}(k)$ are the channel estimates for the two pilot symbols for sub carrier k.

9. An apparatus for interference rejection combining for mitigating interference in received signals in the frequency domain in a telecommunication system, said apparatus comprising:
an input/output unit for receiving and handling received signals from a plurality of receiver antennas;
a frequency selector unit configured to select a sub-group of frequencies of a received signal;
a covariance determining unit configured to determine a joint representation of a covariance matrix for the interference plus noise for a plurality of time slots of the received signal for the selected sub-group of frequencies, the plurality of time slots comprising an entire sub-frame of the received signal for the selected sub-group of frequencies;
a channel estimator unit configured to determine a channel estimate based on two successive pilot symbols of said sub-frame; and
an IRC unit configured to determine IRC coefficients in the frequency domain for each symbol of said sub-frame based on said determined joint representation of the covariance matrix and said determined channel estimate.

10. An apparatus for interference rejection combining for mitigating interference in received signals in the frequency domain in a telecommunication system, said apparatus comprising:
means for selecting a sub-group of frequencies of a received signal;
means for determining a joint representation of a covariance matrix for the interference plus noise a plurality of time slots of the received signal for the selected sub-group of frequencies, the plurality of time slots comprising an entire sub-frame of the received signal for the selected sub-group of frequencies;
means for determining a channel estimate based on two successive pilot symbols of said sub-frame; and
means for determining IRC coefficients in the frequency domain for each symbol of said sub-frame based on said determined joint representation of the covariance matrix and said determined channel estimate.

* * * * *

UNITED STATES PATENT AND TRADEMARK OFFICE
CERTIFICATE OF CORRECTION

PATENT NO. : 8,699,448 B2
APPLICATION NO. : 13/513575
DATED : April 15, 2014
INVENTOR(S) : Lindqvist et al.

It is certified that error appears in the above-identified patent and that said Letters Patent is hereby corrected as shown below:

In the Specification

In Column 5, Line 17, delete "$Y(k)=[Y_1(k)Y_2(k)\ldots Y_{N_r}(k)]^T,$" and insert -- $\overline{Y}(k) = [Y_1(k)Y_2(k)\cdots Y_{N_r}(k)]^T,$ --, therefor.

In Column 7, Line 8, delete "where $\overline{H}(k)$" and insert -- where $\hat{\overline{H}}(k)$ --, therefor.

In Column 7, Line 21, in Equation (16), delete "$\overline{C}(k)=\hat{Q}^{-1}(k)\overline{H}(k),$" and insert -- $\overline{C}(k) = \hat{Q}^{-1}(k)\hat{\overline{H}}(k),$ --, therefor.

In Column 7, Line 64, delete "with $\overline{H}(k)$" and insert -- with $\hat{\overline{H}}(k)$ --, therefor.

In Column 8, Line 12, in Equation (22),
delete "$L(k_{RB})L(k_{RB})^H \overline{C}(k) = \overline{H}(k),$ for $k=1,2,\ldots,N_{SC}^{RB},$" and
insert -- $L(k_{RB})L(k_{RB})^H \overline{C}(k) = \hat{\overline{H}}(k),$ for $k = 1,2,\ldots,N_{SC}^{RB},$ --, therefor.

In Column 8, Line 40, delete "estimate $\overline{H}(k)$" and insert -- estimate $\hat{\overline{H}}(k)$ --, therefor.

In Column 8, Line 41, delete "estimate $\overline{H}(k)$" and insert -- estimate $\hat{\overline{H}}(k)$ --, therefor.

In Column 8, Lines 46-47, in Equation (24),

Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,699,448 B2 delete "$\overline{H}_n(k)=\alpha_n(k)\overline{H}_{rs_1}(k)+\beta_n(k)\overline{H}_{rs_2}(k), \text{ for } n=1,2,\ldots N_{symb}$," and insert -- $\hat{\overline{H}}_n(k) = \alpha_n(k)\hat{\overline{H}}_{rs_1}(k) + \beta_n(k)\hat{\overline{H}}_{rs_2}(k), \text{ for } n = 1,2,\ldots, N_{symb}$, --, therefor.

In Column 8, Line 49, delete "where $\overline{H}_{rs_1}(k)$ and $\overline{H}_{rs_2}(k)$," and insert -- where $\hat{\overline{H}}_{rs_1}(k)$ and $\hat{\overline{H}}_{rs_2}(k)$ --, therefor.

In Column 8, Line 57, delete "compute $\overline{H}_n(k)$," and insert -- compute $\hat{\overline{H}}_n(k)$ --, therefor.

In Column 8, Lines 65-66, delete "$\hat{Q}^{-1}(k_{RB})\overline{H}(k)$," and insert -- $\hat{Q}^{-1}(k_{RB})\hat{\overline{H}}(k)$. --, therefor.

In the Claims

In Column 11, Line 25, in Claim 8, delete "$H_{rs_1}(k), H_{rs_2}(k)$," and insert -- $\hat{\overline{H}}_{rs_1}(k), \hat{\overline{H}}_{rs_2}(k)$ --, therefor.